March 6, 1934.     V. V. SOLDATOFF     1,949,731
AGITATING AND HEATING DEVICE FOR STEEL MELTING PROCESSES
Filed Nov. 29, 1930
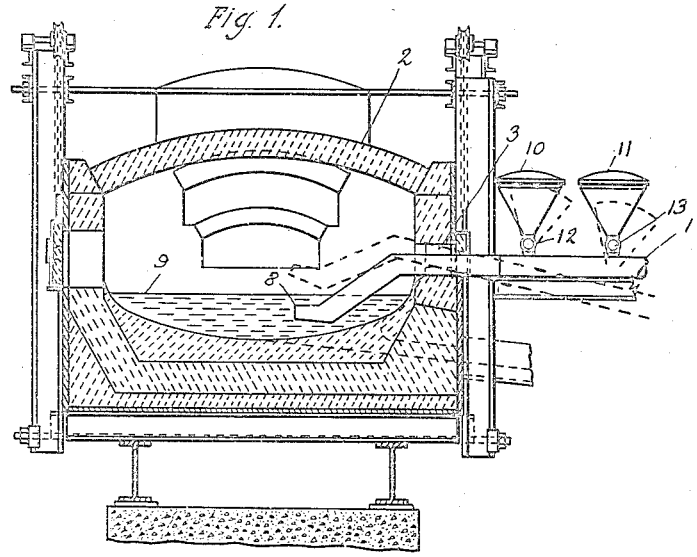
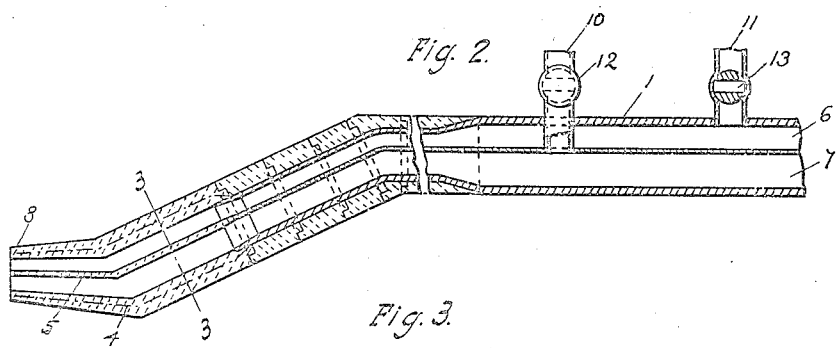
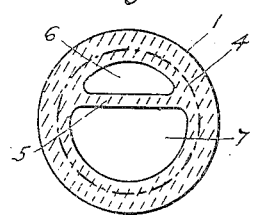
VASSILY V. SOLDATOFF
INVENTOR
BY John P. Nikonow
ATTORNEY Patented Mar. 6, 1934

1,949,731

UNITED STATES PATENT OFFICE 1,949,731

AGITATING AND HEATING DEVICE FOR STEEL MELTING PROCESSES

Vassily Vassily Soldatoff, New York, N. Y.

Application November 29, 1930, Serial No. 499,019

2 Claims. (Cl. 266—34)

My invention relates to an agitating and heating device for steel melting processes. This device consists of reinforced refractory pipes through which a neutral gas (for instance $CO_2$) and the required amount of oxygen is blown. These pipes can work either from the front or far side of the furnace. They are removable, suitably supported on the buckstay of the furnace and have inside of the furnace supporting brackets. The number of them depends upon the surface of the bath. Each pipe is sufficient for from 10 to 100 sq. feet of the bath surface. Furnace can be of the stationary type, but better results will be obtained by using tilting type furnace. Each pipe supports two containers, one for the recarburizing material, which leads to the main passage in the pipe, and another for a burning material, which leads to the minor passage. Both can be put to operation by turning stop valves on them.

My invention is more fully described in the accompanying specification and drawing in which—

Fig. 1 is a sectional elevation of a steel melting furnace with my device. Fig. 2 is an enlarged section of the operating end of the pipe through which the gases and powdered materials are blown into the melt and Fig. 3 is a sectional view of the pipe.

My device consists of a pipe 1 supported on the edge of the wall of a steel melting furnace 2 in a port 3. The external portion of the pipe is made of steel, and the portion inside of the furnace is made of reenforced refractory material. The pipe has a longitudinal wall 5 inside separating it into two longitudinal channels 6 and 7. The refractory portion is doubly bent so as to be immersed with its nozzle 8 into the melted steel 9. Closed hoppers 10 and 11 are mounted on the pipe 1 being provided with valves 12 and 13. The hopper 10 is connected with the channel 7 and the hopper 11 with the channel 6. The pipe 1 can be tilted or rotated on its point of support as shown with dotted lines in Fig. 1, so as to raise its nozzle above the level of the melt.

The operation of my device is as follows.

The hopper 10 is filled with powdered recarburizing (deoxidizing) material of a kind generally used in metallurgy for counteracting the effect of oxygen by restoring the carbon and deoxidizing the iron oxides. The hopper 11 is filled with powdered burning materials such as carbon.

A charge for steel of raw materials is melted in the furnace.

Recarburizing (oxidizing) powdered materials may be blown together with carbon dioxide from the hopper 10 by opening the valve 12. Burning materials (such as powdered carbon) may be blown with oxygen from the hopper 11 by opening the valve 13, when it is desired to raise the temperature of the melt. The relative amounts of the above gases and materials may vary in accordance with the kind of raw materials used and the desired final product. It is important to watch that the gases are blown through both channels while the pipe is submerged, and the blast stopped only after the pipe has been raised above the level of the melt in order to prevent the penetration of the melted steel into the channels.

I claim:

1. A device for heating and agitating melted ferrous materials for making steel, consisting of a pipe comprising two channels, said pipe being movably supported on the wall of a steel melting furnace, a container for a powdered burning material connected with one of said channels, a second container for a powdered recarburizing material, said second container being connected with said second channel, said pipe being adapted to introduce gases under compression into the melted steel in said furnace, said materials being adapted to be moved through said channels by said gases from said containers.

2. A device for heating and agitating melted ferrous materials for making steel, consisting of a pipe comprising two channels, said pipe being rotatively supported on the wall of a steel melting furnace, a container for a powdered burning material connected with one of said channels, a container for a powdered recarburizing material connected with another of said channels, a reinforced refractory nozzle on said pipe, said pipe being adapted to be lowered with its nozzle into the melted steel in said furnace, and means to control the flow of said materials into said channels from said containers, said pipe being adapted to deliver gases under compression into the melted steel with said materials entrained by said gases.

VASSILY VASSILY SOLDATOFF.